Figure 1:
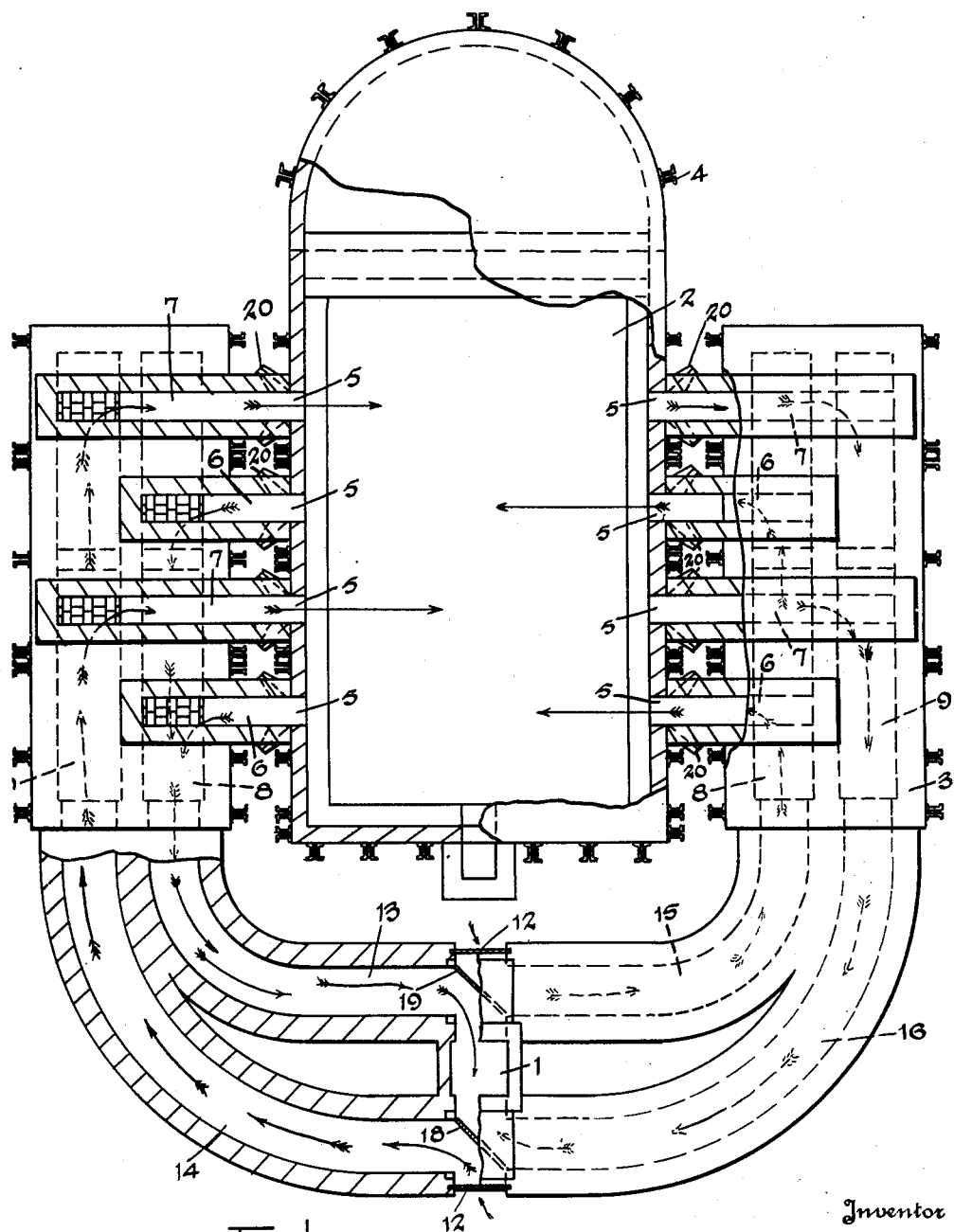

Oct. 18, 1932.  F. G. SCHWALBE  1,882,992
METHOD OF HEATING GLASS AND APPARATUS THEREFOR
Filed Feb. 11, 1931  2 Sheets-Sheet 2

Inventor
Franz G. Schwalbe
By Faust F. Crampton
Attorney

Patented Oct. 18, 1932

1,882,992

UNITED STATES PATENT OFFICE

FRANZ G. SCHWALBE, OF TOLEDO, OHIO

METHOD OF HEATING GLASS AND APPARATUS THEREFOR

Application filed February 11, 1931. Serial No. 514,972.

My invention has for its object to provide a method of heating furnaces, whereby a substantially uniform temperature is maintained in all parts of the furnace, and also to provide an apparatus wherein the method may be conducted.

As is well known in connection with furnaces of the recuperator type, such as used in producing glass, the exhaust gases are directed through a checker-work during alternate periods and, during intermediate periods, the air that is utilized for producing combustion of the fuel is directed through the checker-work to absorb the heat acquired from the exhaust gases during the preceding period. To maintain a constant flame in the furnace, two sets of burners and checker-work are used, each set being utilized during alternate periods to heat the air and maintain the projection of the flame from one or the other of the sets of burners. The burners and their associated air heating checker-work are commonly located on opposite sides of the furnace, with the result that during alternate periods the glass, near the outlets for the exhaust products of combustion, cools while the temperature of the glass on the other side is raised to exceed a desired mean, or proper furnace temperature. In the operation of the furnace, there is thus produced at opposite sides an alternate excess heating and undesired sub-cooling above and below a desired constant and proper mean temperature, although the central portions of the chamber are maintained substantially constant.

By my invention I provide a method of heating glass at all times equally on both sides of the furnace by producing a stratification of flame or burning mixture of fuel gas and air that is projected from opposite sides of the furnace at all times, the stratification lying in closely positioned spaces, or planes, that extend vertically and transversely with reference to the heating chamber of the furnace and proceeding with currents moving in opposite directions in the stratified spaces. Alternate sheets of flame move the same direction and contiguous sheets of flame move in opposite directions. There is thus produced by radiation, conduction and convection, the same heat condition in all parts of the furnace above the glass. What heat may be lost immediately beneath the outlet of the exhaust gases, is replaced by heat received by radiation from flames located on opposite sides of such areas by convection of the melted glass located in such closely positioned areas, and by conduction of the heat of the glass in the immediate vicinity and on opposite sides of such regions.

The invention may be contained in methods and apparatus or furnaces that may be varied in the details of the steps involved in the conduction of methods of heating glass and in the details of the structure of the apparatus in which the method may be carried out. To illustrate a practical application of the invention, I have selected a method involving the use of my invention and an apparatus that embodies the invention as an example of the various methods and structures in which the invention may be used, and shall describe the particular method and structures selected hereinafter, it being understood that variations may be made and that certain features of my invention may be used to advantage without a corresponding use of other features and without departing from the spirit of the invention. The particular apparatus referred to is shown in the accompanying drawings.

Figure 2:
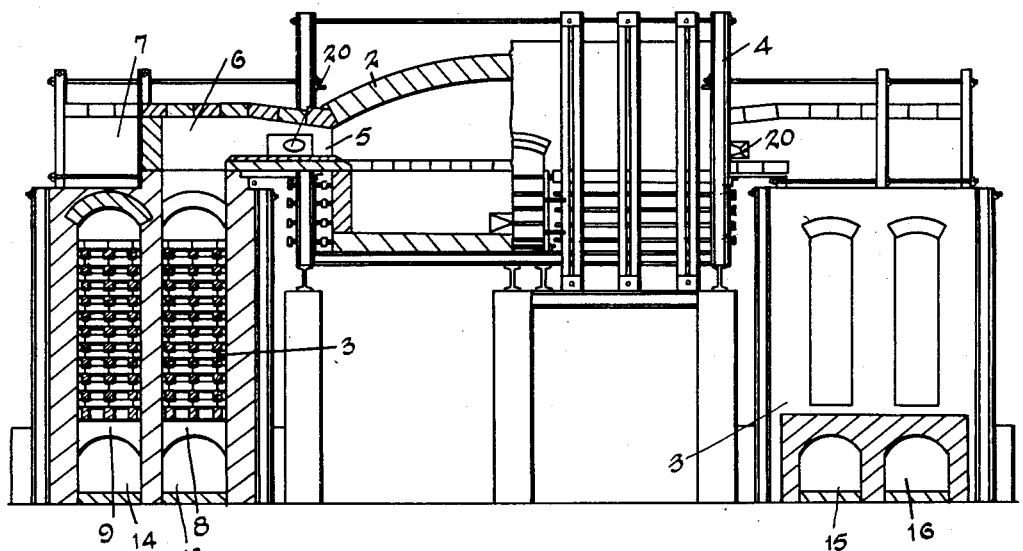
Figure 3:
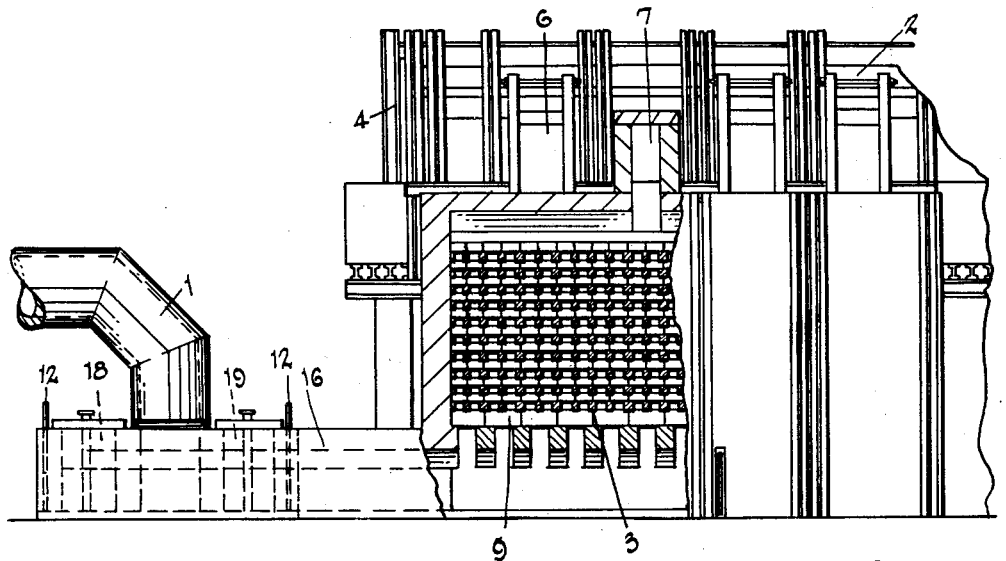

Fig. 1 is a top view of the furnace, a part being shown in section. Fig. 2 is a view of a cross-section of the furnace. Fig. 3 is a side view of the furnace, a part being shown in section.

In the form of furnace which is selected as an example of a structure wherein the method involving the use of my invention may be carried out, a suitable means is provided for producing a movement of the air and gases through the different parts of the furnace, such as a stack 1 which will operate to draw the exhaust gases from the glass heating chamber 2 and also draw the air through the checker-work 3, in the manner well known in the art. The furnace 1 and its checker-work are formed of fired clay block walls reinforced by the usual buckstays and the rods 4. The furnace and the checker-work are interconnected through the ports 5 that are formed in the side walls of the chamber 2.

The checker-work 3 is divided into two parts. Each of the parts of the checker-work is connected to the ports in one side, or wall, of the heating chamber 2, by the passageways 6 and 7. Each of the parts of the checker-work are divided into two sections 8 and 9, the sections 8 are connected to the ports 5 by the passageways 6, while the sections 9 are connected to the ports 5 by the passageways 7. Air is drawn through the ports 12 by the draft produced by the stack 1. The sections 8 and 9 of the checker-work may be connected to the stack 1, or receive air from the atmosphere through ports 12 by means of the passageways 13, 14, 15, and 16.

The direction of the movement of the air to the checker-work, that forms the recuperator of the furnace, and of the gases through the passageways 13, 14, 15, and 16, is controlled by a pair of butterfly valves 18 and 19 which are adapted to establish communication between the stack 1 and section 8 of the recuperator on one side of the furnace, and between the stack 1 and the section 9 of the recuperator on the other side, and, at the same time, will establish a communication between a port 12 and the section 9 of the recuperator on the other side of the furnace. The valve 19 thus admits air to the section 8 of the recuperator on one side of the furnace, while at the same time it establishes a communication between the section 8 on the other side of the recuperator and the stack 1. The stack 1 thus operates to draw the air and exhaust gas through the sections 8 of the recuperator, the air and the gases moving through the passageways 6 that terminate in the ports 5 that are located directly opposite in the opposite walls of the heating chamber 6. Likewise, the valve 18 establishes a communication between the sections 9 of the recuperator and the stack, and thus causes air from the atmosphere to move through the section 9 of the recuperator on the one side of the furnace, and the exhaust gases through the other section 9. The ports 5 of the passageways 7 on one side of the furnace are located directly opposite the ports 5 of the passageways 7 of the other side of the furnace. The same is also true of the ports 5 of the passageways 6 on the opposite sides of the furnace. The valves 18 and 19 also connect the recuperator section 8 on one side of the furnace with the stack and the section 9 of the recuperator on the other side of the furnace with the stack at the same time and, consequently, the adjoining currents of gases across the chamber and through the ports 5 of the wall of the chamber, are opposite in their movement across the chamber, as indicated by the arrows. When the valves 18 and 19 are turned 90 degrees, the direction of flow across the chamber, between opposite ports, is reversed and the air is then passed through the sections of the checker-work which were, during the preceding period, heated by the exhaust gases that move from the furnace during the said preceding period and thus operate to heat the fuel which is emitted at the ports 5 when the ports are used as burners.

In the vicinity of the ports 5 and within their connected passageways 6 and 7, a plurality of fuel gas outlets 20 are located which are connected to a source of supply of gas by means of suitable pipes, in a manner well known in the art. The outlets are directed towards the ports 5 and as the air passes through the passageways 6 and 7, depending on the direction of the flow as determined by the valves 18 and 19, it mixes with the gas that enters the ends of the passageways 6 and 7 which form mixing chambers. The mixture is ignited by the flames which are carried across the center line of the furnace during the combustion of the fuel by the oxygen of the air and towards the opposite ports in the opposite wall of the chamber. The outlets 20 of the fuel communicate through suitable valves with a source of gas supplied that may be turned on and off as the valves 18 and 19 are changed to establish connection with one or the other pair of the recuperator sections. Thus the air is directed through the section 8, of the recuperator 3, and through the passageways 6 on one side of the furnace mixed with the gas from the outlets 20, and exhaust gases enter the passageways 6 and pass through section 8 of the checker-work on the other side of the furnace to the stack 1. Within the chamber 2 the flame mixture, while in combustion, passes across the furnace in intermediate spaces between the flames produced by the gases that move from the ports 5 and which are projected from the passageways 7 through the ports or burners 5. The air is drawn through the passageways 7 and mixed with the gas from the outlets 20 and pass across the furnace and the exhaust gases enter the passageways 7 located on the same side from whence the flame, in the alternate ports, project. The exhaust gas from the passageways 7 are drawn into the stack 1 though one of the sections 9 of the recuperator. Any desired number of ports 5 may be used in the furnace and they may be, if desired, very slosely positioned. Also, the ports 5 may be formed oblong, their major lengths being preferably vertical to enable an increase in number of ports and widen the laminated or sheet movement formation of the flames.

The oppositely crossing flames within the chamber 2 operate to produce substantially the same temperature throughout all portions of the glass, located within the heating chamber 2. By reason of the draft through the ports, adjoining the parts where the fuel mixture is admitted, there is produced a spread of the flame which causes lateral distribution near the ports 5 from which it is emitted and operates to maintain a melting temperature over the melting ingredients of the glass at these portions, as well as beneath the ports 5 from which the flames are projected and, also, by radiation these adjoining portions of glass or batch material are heated by the flame projected from the ports 5. Some heat is also conveyed by way of conduction through the glass materials and by convection between portions of the glass that are melted. There is thus produced a uniform temperature throughout all parts of the furnace, while in the ordinary method of heating glass in furnaces, maximum heat is produced first on one side of the furnace and then on the other, and, during the same intervals, the opposite sides are cooled. By maintaining a constant high temperature on both sides of the furnace there is produced a uniform melting and combining of ingredients which has been found to be highly advantageous.

I claim:

1. The method of heating a furnace which consists in forming flames in stratified currents moving in opposite directions across the furnace at the same time, alternate flames moving in the same direction, and intermediate flames moving in directions opposite the movement of the adjoining flames.

2. The method of heating a furnace which consists in forming flames in stratified currents moving in opposite directions across the furnace at the same time, alternate flames moving in the same direction, and intermediate flames moving in directions opposite the movement of the adjoining flames, and heating the flame fuel mixture by the heat recovered from exhaust gases of the stratified flames.

3. The method of heating a furnace which consists in forming flames in stratified currents moving in opposite directions across the furnace at the same time, alternate flames moving in the same direction, and intermediate flames moving in directions opposite the movement of the adjoining flames, and reversing the directions of the stratified currents at the expiration of short intervals of time.

4. The method of heating a furnace which consists in forming flames in stratified currents moving in opposite directions across the furnace, alternate flames moving in the same direction, and intermediate flames moving in directions opposite the movement of the adjoining flames, and reversing the directions of the stratified currents at the expiration of short intervals of time, and heating the air of the flame producing mixture by the heat recovered from the exhaust gases of the stratified currents during the preceding intervals.

5. In a glass furnace, a glass heating chamber, the side walls of the chamber having a plurality of ports and forming burners and ports for exhaust gases, the ports on each side of the furnace divided into two sets, a checker-work associated with each set of ports, the checker-work interconnected and having a common outlet, valve members for directing air into the checker-work, and exhaust gases into the outlet, the alternate burners of one wall of the chamber connected with the checker-work receiving air, and the intermediate ports of the said wall communicating with the checker-work receiving exhaust gases, the burners of one wall being located opposite the exhaust ports of the other wall, means for operating the said valves for reversing the direction of the currents through the chamber and changing the burners into exhaust ports.

In witness whereof I have hereunto signed my name to this specification.

FRANZ G. SCHWALBE.